Nov. 7, 1950 A. J. HORNFECK 2,529,450
MEASURING AND CONTROLLING SYSTEM
Filed Aug. 3, 1942 5 Sheets-Sheet 2

Inventor
ANTHONY J. HORNFECK
By Raymond W Jenkins
Attorney

Inventor
ANTHONY J. HORNFECK
By Raymond W. Jenkins
Attorney

Nov. 7, 1950     A. J. HORNFECK     2,529,450
MEASURING AND CONTROLLING SYSTEM
Filed Aug. 3, 1942     5 Sheets-Sheet 4

Inventor
ANTHONY J. HORNFECK
By Raymond D. Junkins
Attorney

Nov. 7, 1950          A. J. HORNFECK          2,529,450

MEASURING AND CONTROLLING SYSTEM

Filed Aug. 3, 1942          5 Sheets-Sheet 5

Inventor
ANTHONY J. HORNFECK
By Raymond D. Jenkins
Attorney

Patented Nov. 7, 1950

2,529,450

UNITED STATES PATENT OFFICE 2,529,450

MEASURING AND CONTROLLING SYSTEM

Anthony J. Hornfeck, Cleveland Heights, Ohio, assignor to Bailey Meter Company, a corporation of Delaware Application August 3, 1942, Serial No. 453,486

5 Claims. (Cl. 318—29)

This invention relates to a system for measuring and/or controlling the magnitude of a variable, such as temperature, pressure, rate of fluid flow, position or displacement, although the variable may be of any chemical, physical, electrical, thermal or other characteristic.

In accordance with my invention variations in a variable quantity, quality or condition are translated into variations in an electrical effect, and this effect is then amplified solely through electrical means until sufficient power is available for doing useful work, such as moving an indicator or other exhibiting means, or for regulating the rate of application of an agent contributing to the production or maintenance of the variable.

In devices of the same general type at present known wherein variations in the variable are translated into variations in an electrical effect the necessary amplification is done, at least in part, by mechanical means. There are, therefore, variations in magnitude of the variable translated into variations in an electrical effect which is then translated into a corresponding mechanical movement, such as the deflection of a galvanometer, and thence usually the mechanical movement is translated back into an electrical effect for operating the exhibiting or control device. Because of the small power available in the first electrical effect such devices usually operate on a periodic or step by step principle. That is to say, upon a change in the variable the exhibiting or control device is not continuously operated in correspondence with such change or changes, but periodically by means of a feeler mechanism an exhibiting or control device is changed an amount corresponding to the amount of change in the variable during succeeded increments of time. Such step by step and feeler mechanisms are well known in the art.

It is evident that such devices are necessarily complicated and delicate and do not correctly exhibit the variable during transient periods. My invention is particularly concerned with the elimination of all mechanical movements between the sensitive device and the exhibiting or control device, leading to simplification and removal of the usual time delay, so that the device accurately exhibits the magnitude of the variable even during transient periods. It is evident that many ancillary advantages will follow, among which may be mentioned as obvious the elimination of wear of mechanical parts and the elimination of the necessity of periodic inspection and adjustment to correct for inaccuracies occasioned by mechanical wear.

The great majority of low level D.-C. measuring systems, such as thermocouple potentiometer recorders, use a galvanometer for detecting or measuring the D.-C. input. The galvanometer is a relatively fragile device and is affected by mechanical vibration and easily damaged by overload or mishandling. Vacuum tube or electron amplifiers for low D.-C. voltages have not been successful because of instability and drift. The particular object of the present invention is to provide apparatus and a new method of detecting and amplifying small D.-C. voltages or currents. The present method involves the use of a device (which I term a reactor converter) which converts a D.-C. signal of reversing polarity into a greatly amplified A.-C. signal of reversing phase. The apparatus includes a pair of iron core reactors and has all of the sensitivity of a galvanometer as well as the sturdiness of a transformer. There are no delicate moving mechanical parts to wear out or to be damaged.

The reactor converter produces a greatly amplified A.-C. output signal of reversing phase which is supplied to a phase sensitive electronic amplifier and motor control circuit. In this way a thermocouple, having an output of only a few millivolts, is used to position a reversing motor with no intermediate mechanical or moving parts. The reversing motor may position an indicator or recorder and at the same time a potentiometer for balancing the system, which may be of the null type.

Fig. 2 is a simplified A.-C. bridge circuit including the reactor converter of Fig. 1.

Fig. 5 is a wiring diagram of a voltage regulator which may be used in the circuit of Fig. 3.

Fig. 7 is a simplified wiring diagram of the invention applied to the determination of smoke density.

Fig. 3 is a simplified wiring diagram of the invention applied to the remote telemetering of positions or values.

Figure 1:
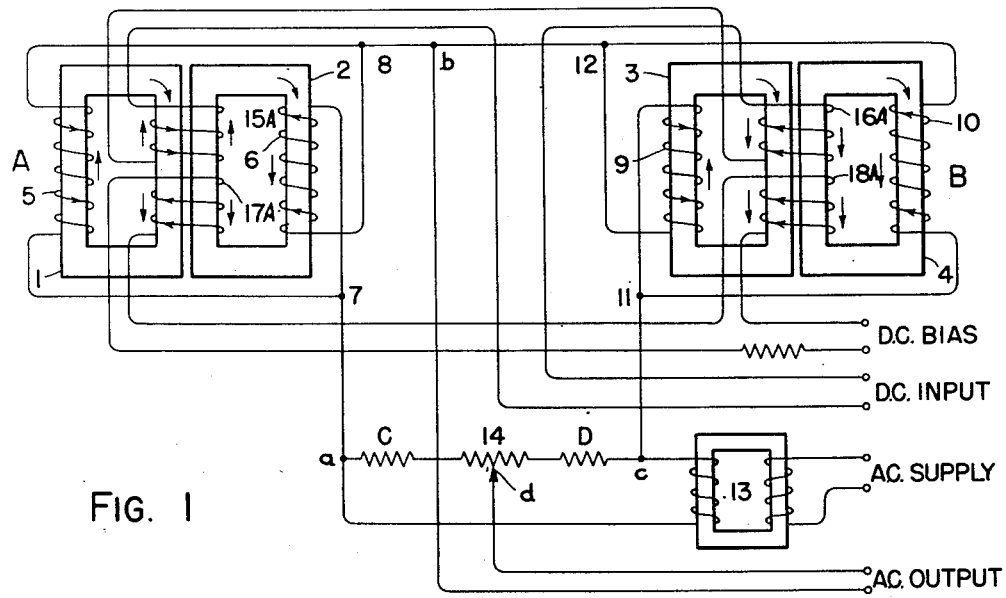
Fig. 1 is a diagrammatic showing of the windings of a reactor converter.

Referring to Fig. 1, I show therein a reactor converter unit as consisting of two reactors of special construction arranged in a simple bridge circuit which is more diagrammatically illustrated in Fig. 2. Each reactor has a winding about each of its outside legs which are connected in parallel and excited from a low voltage alternating current source. In addition there are two windings on the center leg, one of which carries the D.-C. input current, and the other a D.-C. of constant value or bias. These D.-C. windings are connected in such a way that a D.-C. input of one polarity will set up a magnetomotive force to oppose that set up by the bias in one reactor and to aid the bias in the other reactor. Because of the peculiar properties of the core iron a relatively small change in direct current magnetization has a considerable effect on the magnetic permeability.

Referring specifically to Fig. 1, I designate the reactors A and B as including similar metallic ring cores 1, 2, 3 and 4 of laminations of nickel-copper-iron alloy superior to ordinary grades of silicon transformer iron. Certain applications may not require the sensitivity obtainable with such special lamination alloy. The cores 1 and 2 of reactor A are adjacently located with an air gap between the adjacent legs. In similar manner the cores 3 and 4 of reactor B are arranged.

Each reactor has a winding about each of the two outside legs which are connected in parallel and excited by alternating current. The windings 5 and 6 of reactor A are connected in parallel between the terminal points 7 and 8 and are so wound around the core legs 1 and 2 as (at a given instant) to have a current flow in the direction of the arrows indicated in Fig. 1. Similarly the windings 9 and 10 on the outside legs of the cores 3 and 4 of reactor B are connected in parallel across the terminal points 11 and 12. Thus (in Fig. 2) the windings 5 and 6 are diagrammatically illustrated as a single winding 5—6 between the points *a*, *b* of the bridge and the windings 9 and 10 are illustrated as a single winding 9—10 between the points *b*, *c* of the bridge. An insulating and step-down transformer 13 is provided between the A.-C. supply and the A.-C. bridge.

The terminal point *d* of the bridge is adjustable along a zero adjustment or resistance 14 providing means for initially adjusting the bridge into a balanced condition to take care of any slight discrepancy in the exactness of similarity of the reactors A and B, as well as of the fixed resistances C and D which comprise the remaining two legs of the bridge. As clearly illustrated in Fig. 2, the A.-C. output is taken from conjugate terminals *b* and *d* of the bridge.

In addition to the A.-C. windings 5 and 6 of reactor A and the windings 9 and 10 of reactor B there are two D.-C. windings around the center legs of each reactor. Winding 15A of reactor A and winding 16A of reactor B are connected in series and carry the D.-C. input current. Winding 17A of reactor A and windings 18A of reactor B are connected in series and carry a constant bias or direct current of constant value. These D.-C. windings are connected, as shown by the arrows in Fig. 1, in such a way that a D.-C. input of one polarity will set up a magnetomotive force to oppose that set up by the bias in one reactor and to aid it in the other. Because of the peculiar properties of the core iron a relatively small change in direct current magnetization has a considerable effect on the magnetic permeability of the cores.

Referring particularly to Fig. 1, reactor A, it will be observed that at a given instant the A.-C. windings 5 and 6 produce a flux travel in the cores 1 and 2 respectively in a clockwise direction, as shown by the arrows. At the same instant, for the condition of direct current polarity assumed, the D.-C. bias winding 17A produces a flux flow downwardly (in the drawing) in the right-hand leg of core 1 and in the left-hand leg of core 2. At the same instant the input winding 15A produces an upward flux in the same legs of cores 1 and 2. Thus, for the condition illustrated, the flux produced by the two D.-C. windings 15A and 17A are opposing. At the same instant and under the same conditions the D.-C. windings 16A and 18A of reactor B are additive. The direct current bias is constant and of unchanging polarity. A reversal in polarity of the direct current in the input windings 15A and 16A results in the flux of the windings 15A and 17A being additive while that of the windings 16A and 18A is opposing.

In general the action of the reactor converter is one of changing a direct current signal of given polarity into a greatly amplified alternating current signal of given phase; and the ability of reversing the phase of the alternating current signal 180 degrees when the polarity or sign of the direct current signal is reversed. This is accomplished by an alternating current bridge having two fixed resistance legs C and D and two windings 5—6 and 9—10 in the remaining legs of the bridge. Phase of the A.-C. output current or voltage depends upon the polarity of the D.-C. input circuit, while the magnitude of the A.-C. output of the bridge depends upon the magnitude of the D.-C. signal.

Current flow through the A.-C. windings 5—6 and 9—10 is inhibited or controlled by a control of the reactance of the windings. Reactance is directly proportional to permeability so that the voltage drop through the winding is controlled by a control of permeability of the cores on which the windings are located. Thus, specifically referring to Fig. 1, a control of the permeability of the cores 1, 2, 3 and 4 controls the voltage drop through the windings 5, 6, 9 and 10 and the permeability of the cores is under the control of the direct current windings 15A, 16A, 17A and 18A. The value of the current flow through windings 17A and 18A is fixed as a bias in the direction of the arrows. The polarity and value of the current flow in the windings 15A and 16A is determined by the low level direct current which is to be measured. In Figs. 1 and 2 this is indicated merely as "D.-C. input." In other figures of the drawings the D.-C. input is originated by thermocouples or other well known devices which may be connected in potentiometer or bridge circuits.

With the conditions as shown in Figs. 1 and 2 at any given instant, and with the resistances C and D fixed, the input D.-C. assists the bias D.-C. in reactor B and opposes it in reactor A. The permeability of B is therefore decreased and that of A is increased. The reactance of the winding 9—10 is decreased and the reactance of the winding 5—6 is increased. When the reactance of 9—10 decreases the voltage drop through 9—10 decreases, and therefore *b* is less positive relative to *c* than if the reactance of 9—10 were not decreased and (because the voltage drop through A is increased) *b* is less positive relative to *a* than otherwise. Therefore the polarity of *b* and *d* is as shown, and the phase of the A.-C. output is as shown by the arrow thereon. If conditions are reversed so that the input flux bucks the bias in B and assists the bias in A, then the polarity of *b* and *d* will change and a phase shift of 180 degrees occurs in the A.-C. output.

It is therefore apparent that a change in polarity of the D.-C. input results in a change of phase of the A.-C. output of the bridge. The design of the circuit is such that the value of the D.-C. input is never sufficient to completely cancel the bias. Under a condition of bridge balance the D.-C. input is zero. This is accomplished in any known manner as by a potentiometer system, or other null balance method. When the D.-C. input changes in value, thus throwing the bridge out of balance, the polarity of the D.-C. input determines the phase of the bridge A.-C. output while the magnitude of the D.-C. input determines the magnitude of the A.-C. output. Thus the polarity of the D.-C. input determines whether the winding 16A assists or opposes the winding 18A and whether the winding 15A assists or opposes the winding 17A in control of the permeability of the reactors. The magnitude of the D.-C. input determines the amount of assistance or of opposition to the related bias winding and its current flow.

Reactors A and B are of identical construction having the same number of turns on all corresponding windings. This means that the bridge is normally balanced ($E_b = 0$) since the cores of both reactors have the same permeability which results in both A.-C. windings having the same reactance.

Let $X_a$ = reactance in ohms of reactor A
$X_b$ = reactance in ohms of reactor B $N$ = number of turns of A. C. winding;
$L$ = length of magnetic path;
$\mu a$ = A. C. permeability of core of reactor A;
$\mu b$ = A. C. permeability of core of reactor B;
$A$ = cross-sectional area of magnetic core; and
$\omega = 2\pi$ frequency of exciting voltage.

$$X_a = \frac{.4\pi \omega N^2 \mu a A}{L} \quad (1)$$

$$X_b = \frac{.4\pi \omega N^2 \mu b A}{L} \quad (2)$$

The only variables in these equations are the respective A.-C. permeabilities of the cores $\mu a$ and $\mu b$. Hence:

$$X_a = K\mu a \quad (1a)$$

$$X_b = K\mu b \quad (2a)$$

With a D.-C. input in a direction shown in Fig. 2, the permeability of reactor B will be decreased and that of A increased. An output voltage $E_b$ will result which will be proportional to the D.-C. input with a phase relation to the applied voltage $E_0$ as shown by the arrows.

By Kirchoff's Law $$\frac{E_0}{2} - i_0 X_a = -E_b \quad (3)$$

$$\frac{E_0}{2} - i_0 X_b = +E_b \quad (4)$$

The current $$i_0 = \frac{E_0}{X_a + X_b}$$

By substituting for $i_0$ in Equations 3 and 4 and solving for $E_b$ I obtain:

$$E_b = \frac{E_0}{2} \frac{(X_a - X_b)}{(X_b + X_a)} \quad (5)$$

Since $X_a = K\mu a$ and $X_b = K\mu b$ $$E_b = \frac{E_0}{2} \frac{(\mu_a - \mu_b)}{(\mu_b + \mu_a)} \quad (6)$$

At balance $E_b = 0$ hence, $\mu a = \mu b = \mu 0$.

For some small value of D.-C. input there will be a correspondingly small change in the D.-C. magnetic field. Let this equal $dH$. In reactor A this change will be negative and will increase the permeability. In B the permeability will decrease. Hence:

$$\mu_a = \mu_0 + \frac{(d\mu)}{(dH)} dH \quad (7)$$

and $$\mu_b = \mu_0 - \frac{(d\mu)}{(dH)} dH \quad (8)$$

Substituting in Equation 6 for $\mu a$ and $\mu b$ $$dE_b = \frac{E_0}{2} \frac{(d\mu)}{(\mu_0 dH)} dH \quad (9)$$

The factor $$\frac{d\mu}{\mu_0 dH}$$

is the unit rate of change of permeability of the core with change in D.-C. field. It is a basic factor depending on the properties of the core iron. Tests indicate that this factor remains fairly constant over a considerable variation of H. If this is assumed, Equation 9 can be written in integrated form.

$$E_b = \frac{E_0}{2} \frac{(d\mu)}{(\mu_0 dH)} H$$

or $$E_b = (KPE_c) E_d \quad (10)$$

Where $E_b$ = bridge output voltage $\frac{E_0}{2} = E_c$ = A.-C. voltage per reactor $H$ = magnetic field intensity produced by D.-C. input current $$H = \frac{.4\pi N_2 I_d}{L} = \frac{.4\pi N_2 (E_d)}{L(R_d)} = K E_d$$

Where $E_d$ = D.-C. input voltage

And $R_d$ = resistance of D.-C. winding $I_d$ = D.-C. input current $L$ = length of magnetic path $P$ = permeability factor = $\frac{(d\mu)}{(\mu_0 dH)}$ $N_2$ = number of turns on D.-C. winding $$K = \frac{.4\pi N_2}{LRd}$$

The voltage output of the bridge can be calculated by Equation 10 to predetermine the performance of a reactor unit. The magnetic properties of the core iron must however be known. The preceding analysis has shown that the rate of change of permeability with polarizing field is the important factor in determining the sensitivity of the converter.

I utilize two similarly constructed and wound reactors A and B (Fig. 1) as legs in the bridge circuit (Fig. 2). Each of the reactors has a double loop laminated core with adjacent legs spaced by an air gap. The reason for using this construction rather than a single loop core, on one leg of which might be the A.-C. winding and on the other leg the two D. C. windings, is to keep from having any A.-C. voltage induced in the D.-C. windings. With the double loop as shown the A.-C. effects cancel in the center leg windings whereby only D.-C. is effective.

I have found that the construction illustrated and described is highly preferable to a single core element having three legs in which the outer two legs might have parallel A.-C. windings and the center leg the D.-C. windings. With two closed loops wherein the adjacent legs are separated by an air gap I operate all of the core material in a homogeneous magnetizing condition and prevent the build up of residual magnetism in the center leg. Otherwise I have found that a three leg construction produces a shift in bridge balance point which cannot be compensated for because it is variable, depending upon the value of the D.-C. input. Such a construction of adjacent separate loop cores shortens the A.-C. flux path relative to a three-leg core wherein the path is through the outermost legs only. The preferred construction decreases the magnetic reluctance of the core by restricting the A.-C. flux to a shorter path.

Figure 3:
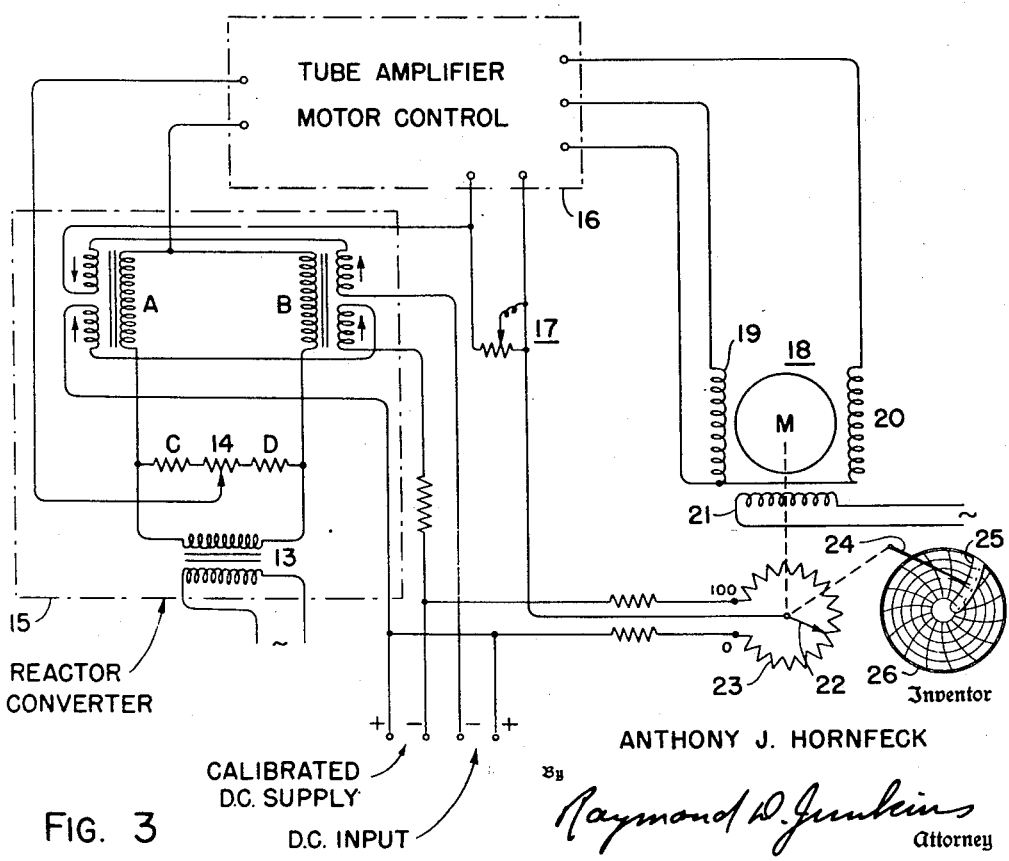
Fig. 3 is a simplified motor control circuit including the reactor converter of Fig. 1.

In Fig. 3 I show a more complete motor control circuit including the reactor converter 15. The reactor converter A.-C. output feeds to a tube amplifier 16, which will be described more in detail hereafter. A feedback from the tube amplifier is illustrated at 17. I indicate a calibrated D.-C. supply or bias and a D.-C. input which is variable in polarity and magnitude. The motor 18 having an A.-C. energized field winding 21 and shading pole windings 19, 20 is controlled as to rotation and direction of rotation by the tube amplifier motor control 16. The motor serves to position a contact arm 22 relative to a potentiometer 23 and at the same time positions an index 24 relative to a scale 25 and to a time revoluble chart 26.

In the motor control system illustrated in Fig. 3 the D.-C. input is to be measured, and the arrangement is such that upon departure of the D.-C. input in one direction or the other from any given value the circuit becomes unbalanced, thereby resulting in rotation of the motor 18 in proper direction and extent to position the contact arm 22 along the potentiometer 23 in a direction and amount to rebalance the circuit. Simultaneously the position of the potentiometer contact arm 22, and thereby an indication of the value of the D.-C. input, is shown relative to the scale 25 and the chart 26.

Figure 4:
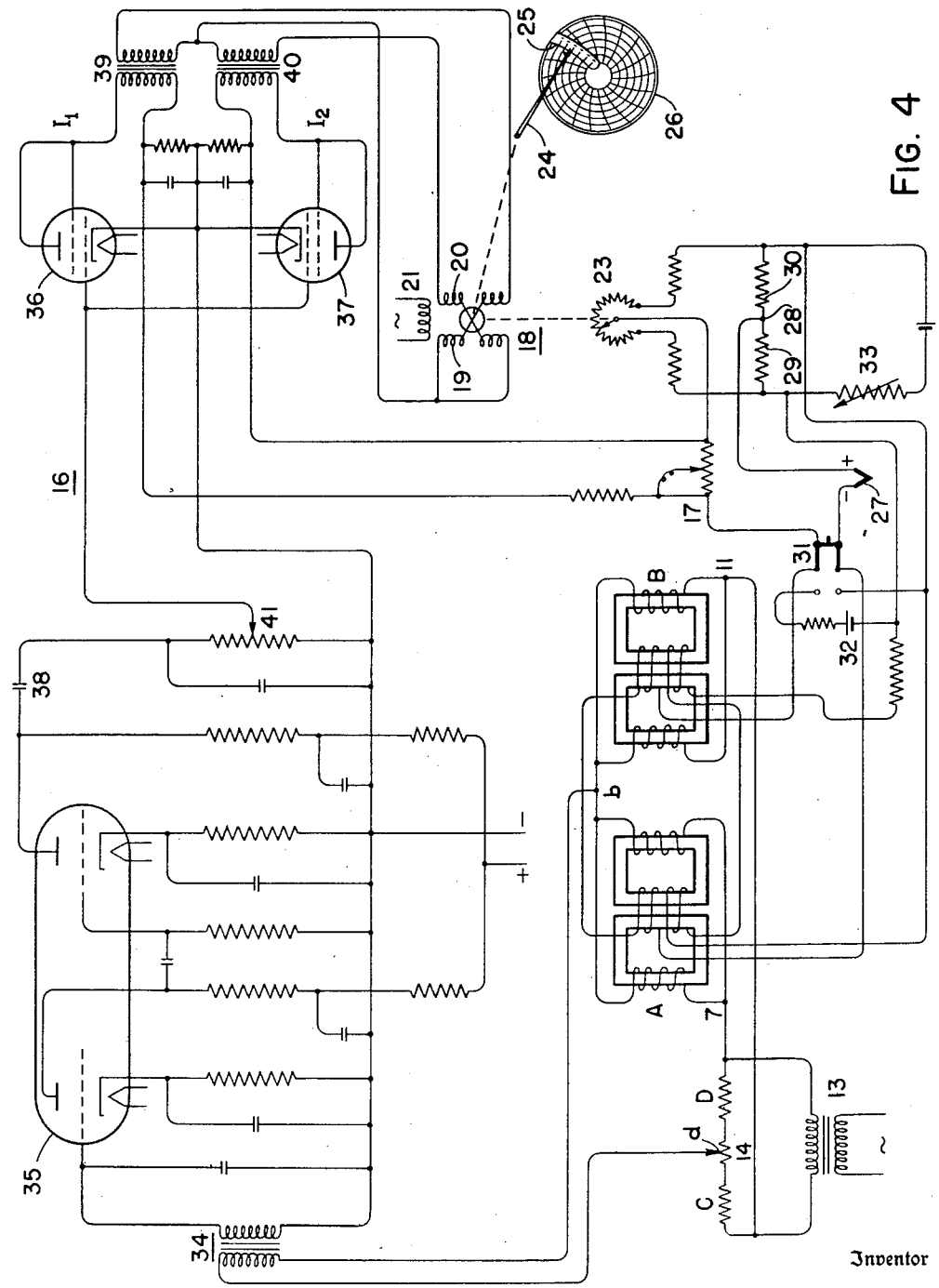
Fig. 4 is a complete wiring diagram of one embodiment of my invention.

Fig. 4 is a more complete wiring diagram than the arrangement of Fig. 3 and wherein the tube amplifier or motor control 16 is shown in wiring detail. The arrangement of Fig. 4 includes a measurement of temperature through the measurement of the D.-C. voltage generated by a thermocouple 27 sensitive to the temperature to be measured, and which temperature is indicated on the scale 25 and recorded on the chart 26. The thermocouple 27 is connected in a standard potentiometer circuit including the balancing potentiometer 23. The cold junction 28 is located between manganin coil 29 and nickel coil 30 comprising compensation for changes in cold junction temperature.

A double pole double throw switch 31 is provided for the D.-C. input. In the position shown, for normal operation, the thermocouple-potentiometer system is connected to the input windings 15A and 16A of the reactors A and B. With the switch 31 thrown to its alternate position the potentiometer circuit is disconnected and the standard cell 32 is connected for checking the system. A variable resistance 33 is provided in the potentiometer circuit in known manner.

The reactor converter 15, which I have described in detail hereinbefore, may have an amplification of 100 to 1. By constructing the reactors so that the reactance is low I can obtain additional voltage gain by means of a bridge output transformer such as is illustrated at 34. A total voltage amplification of the order of 1000 to 1 may thus be obtained as the output of the transformer 34. This is particularly valuable in measuring such small voltages or changes in voltages as are experienced in a thermocouple for temperature measurement. With the general circuit arrangement of Fig. 4 I have found that a motor of this type would reverse on currents less than can be detected on a galvanometer of the type used in commercial potentiometer instruments. Tests indicate that a voltage input of .002 millivolt is sufficient to operate the motor. With a motor of this type, which will start on a shading pole current of ten or fifteen milliamperes, it is believed that in all cases a sensitivity of .01 millivolt can be obtained.

The tube amplifier 16 is a phase sensitive amplifier for control of the motor 18 and employs a two-stage amplification following the transformer 34. A double triode resistance coupled device 35 is provided sensitive to phase of the output of the transformer 34 and thereby sensitive to phase of the output of the reactor converter bridge. The double triode 35 provides a two-stage amplifier for control of the motor control tubes 36 and 37. Upon a departure of thermocouple voltage from any given value the output of the transformer 34 is varied in phase and magnitude in selected correspondence therewith. This change in phase of the output of the transformer 34 is employed to selectively operate the motor 18 in one direction or the other to vary the potentiometer 23 in proper sense to rebalance the system.

The motor 18 is shown as having opposed shading-pole windings 19 and 20 and an alternating current field winding 21. If the pole winding 19 is effectively short circuited the motor will rotate in one direction, and if the winding 20 is effectively short circuited the motor will rotate in opposite direction. If the pole windings 19 and 20 are simultaneously short circuited the motor will not rotate in either direction. Upon an unbalance of the system the particular winding short circuited to produce rotation of the motor 18 is determined by the phase of the current in the output of transformer 34 produced by variation in thermocouple voltage in one direction or the other from previous balanced condition. Rotation of the motor 18 will vary the potentiometer 23 to restore the system to balance. The tube amplifier 16 provides amplification means of the output of transformer 34, sensitive to phase of the output, and for selective short circuiting of the winding 19 or 20.

The output winding of the transformer 34 is connected in the input circuit of the double triode 35 for controlling the motor control tubes 36, 37. The tubes 36, 37 are preferably arranged in circuit to have opposite polarity. That is the anode of the tube 36 is positive during one half cycle and the anode of the tube 37 is positive during the remaining half cycle. The transformer 34 output of one phase will then cause a voltage to be applied to tube 36 which will be in phase with the anode voltage, effecting rotation of the motor 18 in one direction. Unbalance of the system, and phase of the output transformer 34 in opposite direction will then cause a voltage to be applied to the grid of tube 37 which will be in phase with the anode voltage and accordingly will effect operation of the motor 18 in opposite direction.

The output circuits of the device 35 include a source of direct current and certain resistances. The grids of the device 35 may be biased so that it is not conducting or is conducting a predetermined amount. Such direct current as normally flows through the output circuit has no effect upon the potential impressed upon the grids of the tubes 36 and 37, by virtue of a condenser 38. Upon passage of alternating current through the output of the transformer 34 however the current in the output of the device 35 becomes pulsating in character, which will pass through the condenser 38 and render either the tube 36 or 37 conducting selectively in accordance with the phase of the output of transformer 34.

The tubes 36 and 37 may normally be maintained non-conducting. To provide a high degree of sensitivity in some cases it may be preferable to maintain the tubes normally somewhat conducting, in which case the pulsating current originating due to unbalance of the system, will selectively render one or the other of the tubes more conducting.

As previously stated, the phase of the output voltage of transformer 34 depends upon the sense of change of voltage through the thermocouple 27 and the polarity of the direct current input to the reactor converter 15. Likewise the phase of the current in the output circuit of the device 35 will depend upon the sense of change in the input of the reactor converter 15. The pulsating current passing through the output circuit of the device 35 is utilized to control the current transmission through the pair of electron discharge devices or motor control tubes 36 and 37, the output circuits of which are inductively coupled through transformers 39 and 40 to the circuits of the pole windings 19 and 20 respectively. Upon the tube 36 being rendered conducting the impedance of the primary of the transformer 39 is lowered sufficiently so that the winding 19 is effectively short circuited, causing rotation of the motor 18 in one direction. Likewise when the tube 37 is rendered conducting, the impedance of the primary of the transformer 40 is sufficiently decreased so that the winding 20 is effectively short circuited, causing rotation of the motor 18 in opposite direction. The transformers 39 and 40 may be considered as the current source for the tubes 36 and 37. In the embodiment shown in Fig. 4 I preferably arrange the devices 36 and 37 so that they are of opposite polarity.

The pulsating component of the voltage across the plate resistance of the device 35 is impressed upon the grids of the tubes 36 and 37 through the condenser 38, which inhibits the passage of direct current. It will, therefore, be solely the component of the voltage across the output circuit of the device 35 produced by the voltage from the output of the transformer 34 which will be effective for controlling the grid-cathode potential relationship of the tubes 36 and 37. As the tubes 36 and 37 have opposite polarity, the particular tube rendered conducting during each half cycle when the proper anode-cathode potential relationship exists will be determined by the polarity or phase of the voltage from the output of the transformer 34, and therefore by the polarity of the D.-C. input to the reactor converter 15. The particular pole winding 19 or 20 of the motor 18 which is energized upon departure from balance is selectively determined in dependence upon the sense of unbalance of the potentiometer system. As heretofore described, operation of the motor 18 serves to position the index 24 and at the same time to vary the potentiometer 23 to rebalance the system. The possibility of movably adjusting the point of connection of the grids of the tubes 36 and 37 along the resistor 41 provides a sensitivity adjustment for the amplifier 16.

I have found that in the circuit so far described difficulty may be encountered because of the motor hunting about the balance point. This instability is caused by the inductive time lag in the reactor unit which produces an inertia or fly-wheel effect. To most effectively eliminate this instability I provide a feedback to the D.-C. input circuit in such a direction as to oppose the input. Such a connection is made as at 17. In this circuit a portion of the unbalanced current between the two motor control tubes 36, 37 is fed back to the D.-C. input circuit in such direction as to oppose the input. It will be observed that at balance the two tubes 36, 37 conduct equally and no feed-back results. An input of a certain polarity will increase $I_1$, the plate current of tube 36, and decrease $I_2$ the plate current of tube 37 producing a feed-back of given polarity. An input of opposite polarity will produce corresponding feedback in opposite direction to the first and again opposing the input. The effect of this feedback is to decrease the time lag in the converter and to produce a momentary shift in the zero input point so that the D.-C. input circuit will be balanced before the true balance is reached.

In general, the system involves the measurement of low level D.-C. voltages by balancing against a calibrated source of voltage. The circuit is similar to the conventional recording pyrometer with the important exception that the galvanometer and mechanical amplifying system are replaced by the reactor converter and tube amplifier or motor control. Thus there are no mechanical moving parts between the thermocouple and the motor which is controlled. The considerable amplification of the D.-C. input in the reactor converter permits the system to be used on much lower ranges than can be obtained with known systems. The reactor converter is an extremely sturdy device having no delicate mechanical parts, such as vibrating contacts or galvanometers. Factors such as mechanical vibration and shock, overload, ambient temperature changes, etc. should have no effect on the sensitivity or accuracy of the reactor converter. No servicing or replacement of this device should be required during the entire life of the instrument.

Fig. 5 illustrates a known circuit for supplying a regulated source of D.-C. wherein the tubes 41a and 42 are gas tubes which maintain a constant voltage drop regardless of current. Such a system may, for example, be used in connection with Fig. 3 for applications where the extreme accuracy of the standard cell 32 of a calibrated voltage source is not required. For example, the recording of large direct currents by measuring the millivolt drop across a shunt. In connection with Figs. 3 and 5 the shunt across the large D.-C. current would be connected to the D.-C. input of Fig. 3, whereas the "D.-C. regulated" of Fig. 5 would be substituted for the "calibrated D.-C. supply" of Fig. 3. The "D.-C. supply" of Fig. 5 is the station bus or other unregulated source of direct current.

Figure 6:
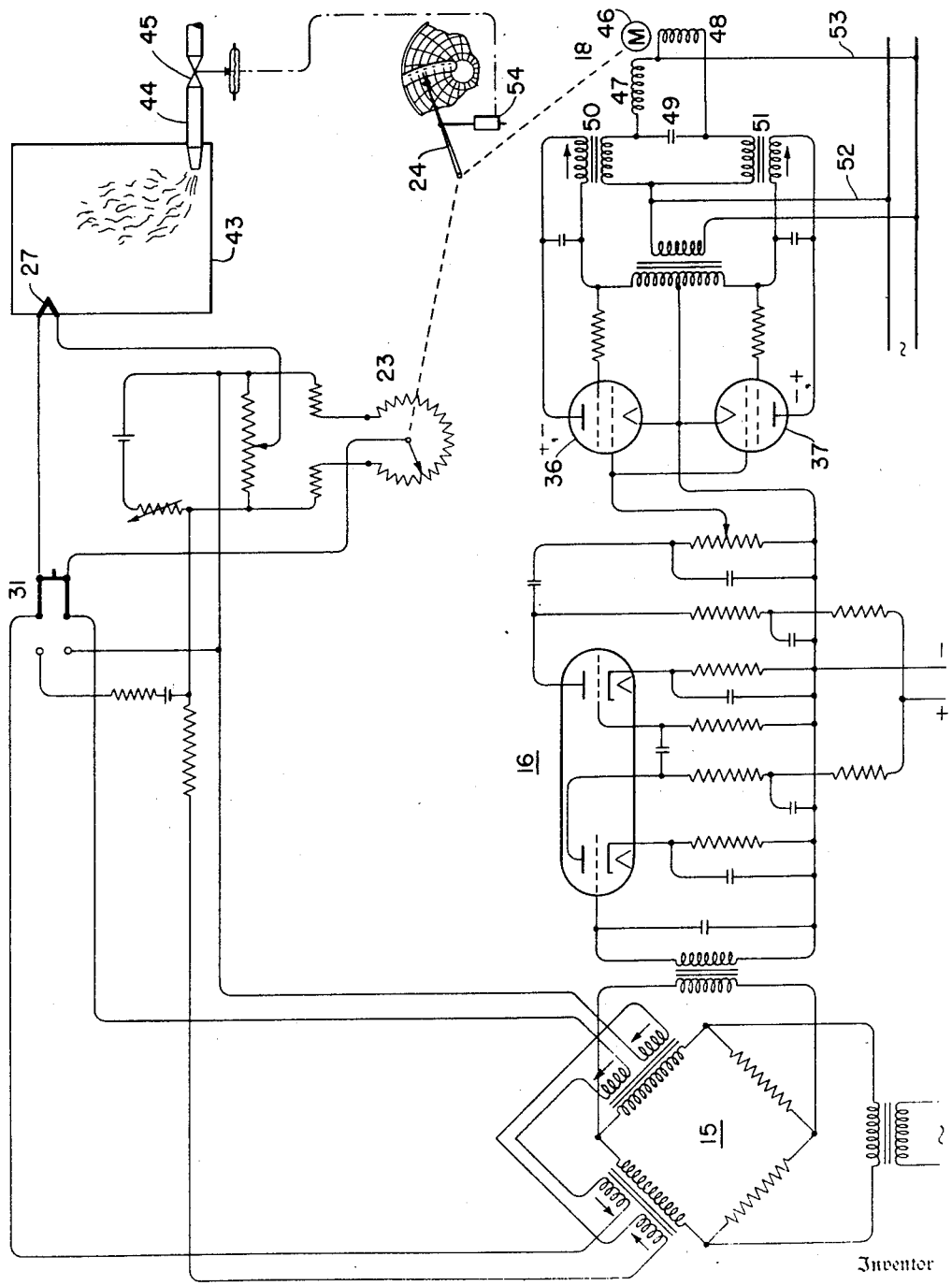
Fig. 6 is a wiring diagram of the circuit of Fig. 4 with certain modifications.

Fig. 6 is in general similar to the arrangement of Fig. 4. However, in Fig. 6 I have illustrated the thermocouple 27 as located within a furnace 43, sensitive to the temperature thereof, and to which fuel is supplied through a pipe 44 under the control of a pneumatically actuated valve 45. The thermocouple 27 is connected in a potentiometer system similar to that illustrated and described in connection with Fig. 4, feeding the reactor converter 15 which in turn feeds the tube amplifier 16 for control of the motor tubes 36, 37. In Fig. 6 the motor 18 is illustrated as a capacitor-run alternating current motor having a wound rotor 46 and stator windings 47 and 48, the latter constituting running coils electrically 90 degrees apart. The capacitor-run motor is provided with a capacitor or condenser 49 which, when the motor is rotating, is in series with either the winding 47 or the winding 48 depending upon desired direction of rotation. Such a motor runs as a two-phase alternating current motor and not only may be reversed as to direction of rotation, but has speed control when rotating in either direction.

The arrangement in general provides a D.-C. control current for two saturable core reactors 50 and 51. These reactors are connected in the motor circuit in such a way that the speed of the motor rotor 46 depends on the degree of saturation of the reactor and the direction of rotation depends on which reactor is being saturated. The motor circuit loop comprises (as clearly indicated in Fig. 6) the output windings of the reactors 50, 51, the motor windings 47 and 48 and the capacitor 49. The loop is provided with alternating current energy from a source by way of conductors 52, 53. The saturated windings may in the condition of equilibrium be unsaturated, partially saturated, or fully saturated. So long as the degree of saturation of the windings is the same, then the motor control loop is in a steady state of equilibrium or balance, and no rotation of the rotor 46 occurs. Upon unbalance of the degree of saturation of the windings, i. e. with either the saturation of the one winding being decreased relative to the other, or with the saturation of one winding being increased relative to the other, there will result a rotation of the rotor 46 in predetermined direction and at a speed determined by the unbalance of the output of the saturable core reactors, which is determined by the difference in degree of saturation of the windings. When the motor is rotating the capacitor 49 is always in series with either the winding 47 or with the winding 48 and the motor is termed a capacitor-run motor.

The motor 18 is adapted to position the balancing potentiometer 23, as well as the indicator 24, and at the same time positions the movable element of a pilot valve 54 controlling air or other motive fluid pressure effective upon the valve 45 for positioning the same. I thus provide a means for indicating and continuously recording the value of the temperature to which the thermocouple 27 is sensitive, and at the same time control the rate of supply of fuel through the agency of the valve 45 if desirable to maintain the temperature at a predetermined value or to return it toward such value upon departure therefrom in one direction or the other. It will be obvious that the fuel pipe 44 and control valve 45 are diagrammatic only and that the fuel under control may be gaseous, liquid or solid as desired.

The general system may include the balancing of a direct current bridge. This requires no calibrated source of D.-C., so that the recorder is simplified to that extent. In Fig. 7 I have shown such a system wherein the arrangement is utilized for measuring and indicating the density of smoke or combustion gases passing through a duct 55. Aligned openings in the wall of the duct allow light from a source 56 to contact a photo voltaic device 57 after passing through the duct 55. Light from the source 56 falls directly upon the photo voltaic device 58 without first passing through the smoke in the duct 55. The system in general comprises a comparison of the amount of light falling upon devices 57, 58, which comparison gives a measure of the impedance of the smoke to the passage of light from 56 and thereby a determination of the smoke density.

The D.-C. bridge includes the devices 57, 58 as well as a range adjustment 59 and a balancing resistance 60. When the D.-C. bridge is in balance, then no D.-C. output is effective through the conductors 61 as an input to the reactor converter 15 for control of the motor 18. When, however, the density of the smoke passing through the duct 55 varies, then the amount of light reaching the photo voltaic device 57 varies in predetermined direction, unbalancing the bridge and applying to the conductors 61 a D.-C. potential of predetermined polarity. Through the circuit and means previously described the reactor converter 15 and tube amplifier 16 cause the motor 18 to rotate in predetermined direction, thereby moving the balancing resistance 60 in proper direction to rebalance the bridge. At the same time the motor 18 positions the index 24, providing a continuous record of smoke density or other units in which the chart 26 and index 25 may be calibrated.

Figure 8:
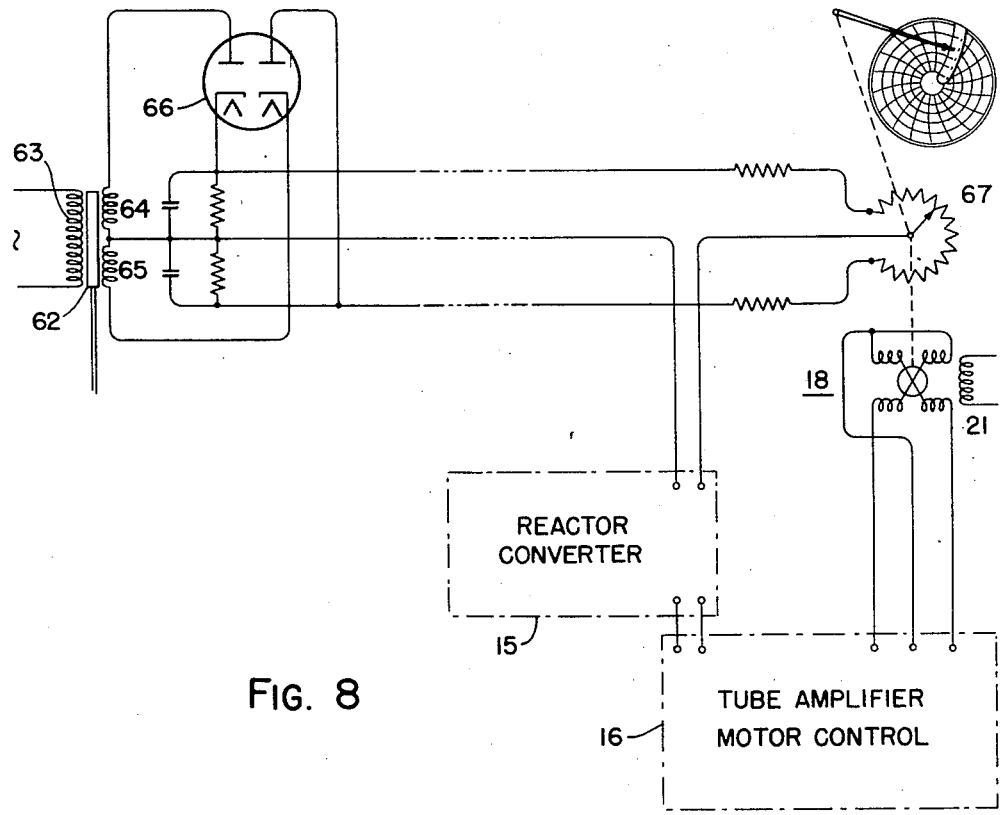

The arrangement of Fig. 8 provides a D.-C. bridge circuit for feeding the reactor converter 15 wherein the core element 62 may be positioned by a rate of flow meter, level sensitive device, or any similar apparatus representative of the position or value; for remotely telemetering such position or value. I have found that such a system as is illustrated in Fig. 8 is readily adaptable for telemetering distances of fifty miles or more between the transmitting portion, as illustrated at the left of Fig. 8, and the receiving portion illustrated at the right of Fig. 8. The transmitter includes an alternating current primary coil 63 and a pair of secondary coils 64, 65. The position of the movable core 62 relative the coils 63, 64, 65 determines the A.-C. voltages of the secondary coils. Such A.-C. voltage of the secondary coils is converted into D.-C. voltage through the agency of the device 66 and the ratio of the two rectified voltages is balanced by the recording potentiometer 67 at the receiving end of the system. It is not necessary that the alternating current source supplying the coil 63 be the same as the A.-C. source supplying the motor field winding 21. In fact they may be from completely different systems and phase.

Figure 9:
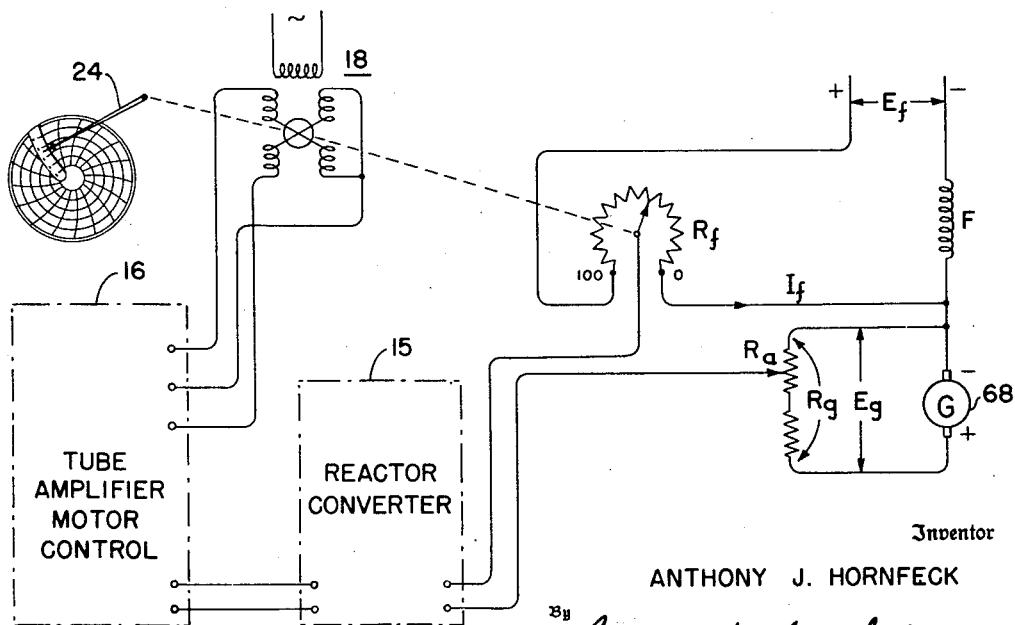
Fig. 9 is a simplified wiring diagram of the invention applied to a tachometer.

In Fig. 9 I have illustrated the use of the reactor converter 15 and tube amplifier 16 in a speed recorder utilizing a tachometer generator to produce a generated voltage of which a portion is balanced against a voltage drop produced by the field current flowing through a calibrated resistor $R_t$. The equation for generated voltage is:

$$Eg = Kr\, I_f \qquad (11)$$

Where

K = constant of the machine
r = speed
$I_t$ = field exciting current

At balance or for zero input to the converter.

$$Eg \frac{R_a}{R_t} = I_f R_f S \qquad (12)$$

Where S = travel of contact on potentiometer $R_t$ in terms of maximum travel.

The solution of Eg (12) for S is $$S = \frac{Eg}{I_f} \frac{R_a}{R_t R_f} = \frac{R_a}{R_t R_f} Kr \qquad (13)$$

$$I_f \frac{1}{\frac{R_a}{R_t R_f}} = K,\ (13)\ \text{reduces to}\ S = r \qquad (14)$$

and the position of the sliding contact on resistor $R_t$ is a direct measure of the speed.

It will be apparent that I have illustrated and described a preferred embodiment of my invention but that I am not to be limited thereto as many substitutions of equivalent apparatus and circuit may be made without destroying the intent and novelty of my invention.

Certain portions of the disclosure of my application not claimed herein are disclosed and claimed in Patent No. 2,275,317 to John D. Ryder or in the copending application of John D. Ryder Serial No. 424,281 filed December 24, 1941, now Patent 2,333,393, granted November 2, 1943.

What I claim as new, and desire to secure by Letters Patent of the United States, is:

1. A reactor converter for converting a single low-level direct current signal of reversing polarity into an alternating current signal of reversing phase, comprising in combination, an alternating current bridge having two adjacent fixed resistance legs and two adjacent winding legs, a source of alternating current for a diagonal of said bridge extending between the junctions of unlike legs, a magnetic core structure for each of said winding legs, control windings associated with said cores and traversed by said signal current, a reversible motor having a pair of field windings, a pair of thermionic tubes controlling the impedance in each field winding circuit, said tubes being selectively responsive to the output from the other diagonal of the bridge whereby the motor direction depends upon the phase of the current therefrom.

2. A reactor converter for converting a low-level direct current voltage of reversing polarity into an alternating current voltage of reversing phase, comprising in combination, a balanceable electrical network having four legs, a source of A. C. for said network, two of the said legs having fixed voltage drop thereacross for said source and the remaining two legs adapted to have varying voltage drop thereacross, magnetic core elements associated with said remaining pair of legs, direct current windings associated with said core elements and with said D. C. voltage for varying the saturation thereof, means for varying the direct current in said saturating windings to rebalance said network following an unbalance thereof, control devices for said means connected for selective actuation in accordance with the phase of and by the amplitude of the alternating current output of said network, said devices including thermionic tubes having alternating current supplied to the anodes thereof.

3. A reactor converter for converting a low-level direct current voltage of reversing polarity into an amplified alternating current voltage of reversing phase, including in combination, an alternating current bridge, a source of alternating current for said bridge, two fixed resistance legs in series in said bridge across said source, two winding legs in said bridge, magnetic core elements associated with each of said winding legs, a constant direct current voltage winding of uniform polarity associated with each of said core elements providing a uniform predetermined bias saturation, and a single separate control direct current saturating winding of reversible polarity associated with each of said core elements and so wound as to amplify the saturation produced by the constant potential direct current winding of one of the bridge legs and to oppose the saturation produced by the constant potential direct current winding of the other of the bridge legs dependent upon the polarity of the direct current in said separate control windings.

4. In a system of the type described, in combination, a balanceable bridge having a pair of inductance windings and an adjustable balancing resistance, a continuously alternating current energized inductance coil adjacent said inductance windings, a magnetic pole piece positionable relative the inductance windings and the inductance coil in accordance with the value of a variable to be measured to vary the inductance effect from the energized coil to the windings to unbalance the bridge, means to convert the output of the bridge to a single, low-level direct current signal of reversing polarity, a balanceable electrical network receiving said signal comprising a reactor converter for converting it to an amplified alternating current signal of reversible phase, and phase sensitive means responsive solely to the alternating current signal rebalancing the said resistor following a departure from balance.

5. Measuring apparatus to measure a unidirectional current including an alternating current bridge network having input terminals and output terminals, two adjacent arms of said bridge network comprising fixed resistances and the remaining two adjacent arms each comprising a coil wound on associated magnetic material, a direct current circuit comprising two series connected coils, one wound on the magnetic material associated with one of the first mentioned coils and the other wound on the magnetic material associated with the other of the first mentioned coils, means to polarize the magnetic material associated with each of said pairs of coils, means to supply alternating current to the input terminals of said bridge network, the output terminals of said bridge network being disposed on said bridge network at points such that said bridge network is balanced when no current is supplied to said second mentioned pair of coils, a potentiometer measuring circuit, means to supply direct current of one polarity or of the opposite polarity to the series connected coils in said direct current circuit in accordance with the direction of unbalance of said potentiometric measuring circuit, electronic amplifying means having an input circuit coupled to the output terminals of said bridge circuit and having an output circuit, power means connected to the output circuit of said electronic amplifying means to rebalance said potentiometric measuring circuit upon unbalance thereof, means associated with said last mentioned output circuit to produce a voltage corresponding in value to the degree of unbalance of said bridge and means to oppose this voltage to that flowing in the direct current circuit.

ANTHONY J. HORNFECK.

REFERENCES CITED

The following references are of record in the file of this patent:

UNITED STATES PATENTS

| Number | Name | Date |
|---|---|---|
| Re. 15,597 | Brewer | May 15, 1923 |
| 1,503,213 | Stoekle | July 29, 1924 |
| 1,586,233 | Anschutz-Kaempfe | May 25, 1926 |
| 1,739,579 | Dowling | Dec. 17, 1929 |
| 1,794,222 | Whitney | Feb. 24, 1931 |
| 1,824,577 | Sorensen | Sept. 22, 1931 |
| 1,916,307 | Gilson | July 4, 1933 |
| 1,945,831 | Stansbury | Feb. 6, 1934 |
| 1,955,322 | Brown | Apr. 17, 1934 |
| 2,032,455 | Williams | Mar. 3, 1936 |
| 2,084,899 | Edwards | June 22, 1937 |
| 2,090,087 | Werder | Aug. 17, 1937 |
| 2,096,047 | Leeds | Oct. 19, 1937 |
| 2,112,091 | Harrison | Mar. 22, 1938 |
| 2,113,164 | Williams | Apr. 5, 1938 |
| 2,132,960 | Montrose-Oster | Oct. 11, 1938 |
| 2,263,497 | Harrison | Nov. 18, 1941 |
| 2,264,956 | Schmitt | Dec. 2, 1941 |
| 2,276,816 | Bagno | Mar. 17, 1942 |
| 2,276,822 | Bowman et al. | Mar. 17, 1942 |
| 2,277,849 | Fitzgerald | Mar. 31, 1942 |
| 2,286,985 | Hanson | June 16, 1942 |
| 2,306,998 | Claesson | Dec. 29, 1942 |
| 2,310,955 | Hornfeck | Feb. 16, 1943 |
| 2,331,934 | Satterlee | Oct. 19, 1943 |
| 2,350,329 | Hornfeck | June 6, 1944 |
| 2,358,103 | Ryder | Sept. 12, 1944 |
| 2,364,483 | Side | Dec. 5, 1944 |
| 2,367,868 | Jones | Jan. 23, 1945 |
| 2,367,869 | Jones | Jan. 23, 1945 |

FOREIGN PATENTS

| Number | Country | Date |
|---|---|---|
| 489,271 | Great Britain | July 22, 1938 |